United States Patent [19]
Tamura

[11] Patent Number: 5,931,211
[45] Date of Patent: Aug. 3, 1999

[54] RADIAL TIRE WITH SPECIFIED BELT REINFORCING LAYER CORD

[75] Inventor: Yasuyuki Tamura, Tokyo, Japan

[73] Assignee: Bridgestone Corporation, Tokyo, Japan

[21] Appl. No.: 08/668,627

[22] Filed: Jun. 19, 1996

[30] Foreign Application Priority Data

| Jun. 19, 1995 | [JP] | Japan | 7-151617 |
| Jun. 19, 1995 | [JP] | Japan | 7-151618 |
| Jun. 11, 1996 | [JP] | Japan | 8-149332 |

[51] Int. Cl.$^6$ .............. B60C 9/18; B60C 9/20; B60C 9/22; B60C 11/00; B60C 13/00
[52] U.S. Cl. .............. 152/209.5; 152/525; 152/527; 152/531; 152/533
[58] Field of Search .................. 152/527, 531, 152/533, 209 R, 525, 209.5

[56] References Cited

FOREIGN PATENT DOCUMENTS

| 0 335 588 | 10/1989 | European Pat. Off. . |
| 0 454 432 A3 | 10/1991 | European Pat. Off. . |
| 2 244 634 | 4/1975 | France . |
| 1-145203 | 6/1989 | Japan . |
| 1-247204 | 10/1989 | Japan . |
| 2-147407 | 6/1990 | Japan . |
| 3-253406 | 11/1991 | Japan . |
| 5-238205 | 9/1993 | Japan . |
| 6-24208 | 2/1994 | Japan . |
| 6-115312 | 4/1994 | Japan . |
| 6-305304 | 11/1994 | Japan . |

OTHER PUBLICATIONS

Patent Abstracts of Japan, JP5163612, Jun. 29, 1993, Teijin Ltd.
Patent Abstracts of Japan, JP6184815, Jul. 5,1994, Teijin Ltd.

*Primary Examiner*—Adrienne C. Johnstone
*Attorney, Agent, or Firm*—Sughrue, Mion, Zinn, Macpeak & Seas, PLLC

[57] ABSTRACT

A radial tire has a pair of bead portions; a carcass which is toroidal and extends across the bead portions; a tread portion positioned at a crown portion of the carcass; and sidewall portions of the carcass, and at least one belt reinforcing layer is disposed at the entire tread portion and/or at both end portions of the tread portion at an outer peripheral side of at least two belt layers which are disposed at an inner side of the tread portion, the belt reinforcing layers being formed by narrow, rubber-coated strips, which include a plurality of fiber cords, being wound endlessly in spirals so that the fiber cords are substantially parallel in a circumferential direction of the tire, wherein the belt reinforcing layer cords comprise organic fiber cords, the elongation of the organic fiber cords under 1.4 g/d load at 50±5° C. is less than or equal to 2.7%, and the elongation under 0.7 g/d load at 170±5° C. is 1.5 to 6.0%.

21 Claims, 2 Drawing Sheets

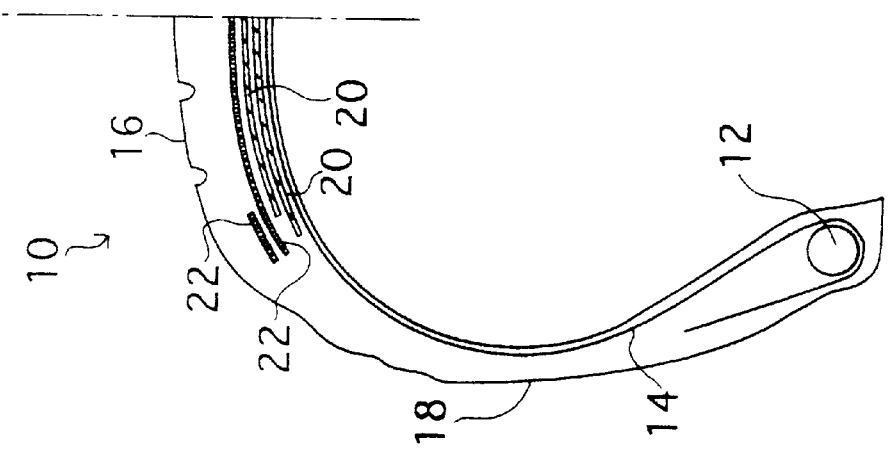
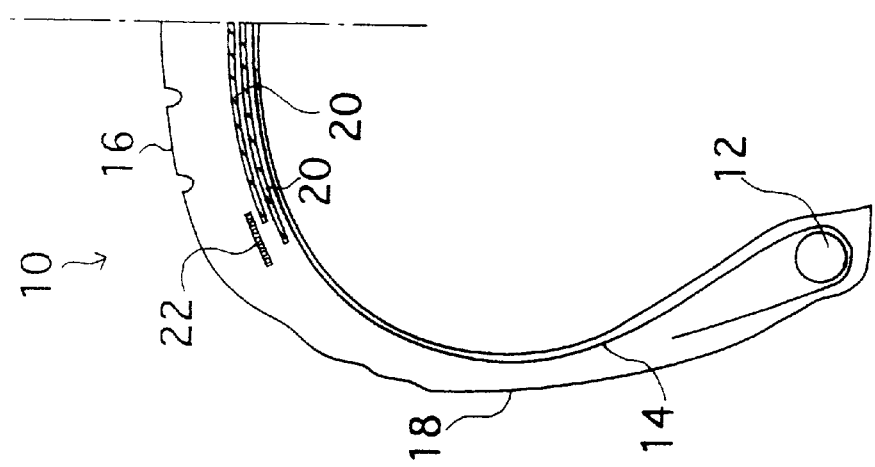
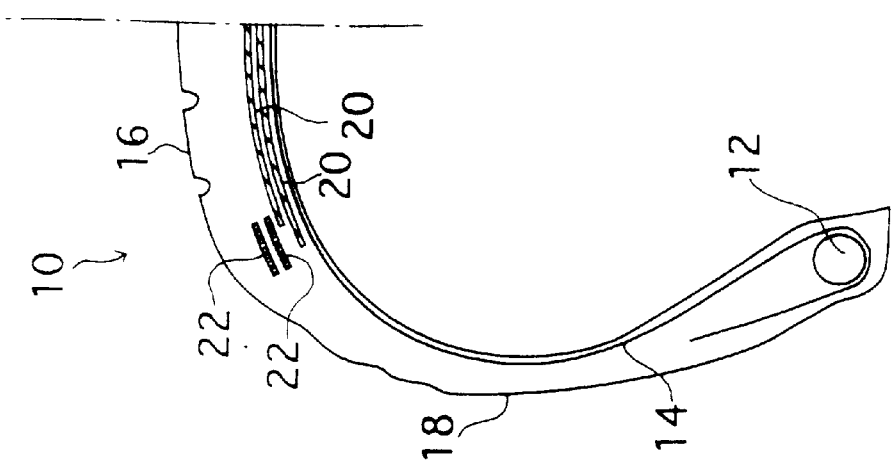

RADIAL TIRE WITH SPECIFIED BELT REINFORCING LAYER CORD

BACKGROUND OF THE INVENTION

1. Field of the Invention

The present invention relates to a radial tire which has decreased rolling resistance and increased durability at high speeds, and which excels in handling stability and leads to a marked reduction in road noise.

2. Description of the Related Art

As vehicles have become more advanced and more high-quality, improvements in the mitigating of vibrations and in the comfort of the ride, especially in passenger vehicles, have progressed rapidly in recent years. Accordingly, low noise and a comfortable ride are required of tires as well.

In particular, a reduction in the noise which can be heard within the vehicle is desirable. An example of such noise is so-called road noise which is caused by the tires traveling over recesses and projections in the road surface while the vehicle is traveling, and the vibrations of the tires being transmitted such that the air within the vehicle vibrates. The demand for a reduction in road noise has become stronger in recent years.

Further, as vehicles have become more advanced, they have also become faster and have come to have a higher output. Conventional tires, in which only the comfort of the ride and a reduction in road noise have been improved, also must maintain high levels of durability at high speeds, uniformity, handling stability, and low rolling resistance.

The following are examples of basic, conventional methods for reducing road noise: (1) a method in which the rubber of the tire tread portion is softened; (2) a method in which the tension of the belt layers is increased by varying the configuration of the tire carcass; and (3) a method in which the rigidity of the belts in the circumferential direction thereof is increased by pressing an entire crossing belt layer or both end portions of the crossing belt layer with reinforcing layers having rubber-coated cords, e.g., nylon cords, disposed in the circumferential direction, or a method in which the reinforcing layers having cords are wound in spirals at the outer side of the belt layers so that there is no joint on the periphery (for example, Japanese Patent Application Laid-Open JP-A No. 6-24208).

Each of these methods has advantages and disadvantages.

The method to be used is selected in accordance with the purpose, and a combination of methods can be used. In particular, above method (3) is used as a method which improves durability at high speeds rather than a method which results in a reduction in road noise. This method (3) is currently and will most likely continue to be the main method used for high performance, high quality tires.

Special methods are known such as (4) a new method of sandwiching circumferential direction cords and a high modulus rubber sheet between the carcass layer and the belt layers as disclosed in JP-A No. 5-238205, and (5) a method of reinforcing portions corresponding to a tire vibration mode as disclosed in JP-A No. 3-253406. Further, the following methods are examples of application of a tire formed by above method (3), in which nylon cords are wound in spirals on the outermost layer of the belt in order to improve durability at high speeds and the high speed level in particular: (6) a method of winding cords having a high modulus of elasticity (e.g., JP-A No. 2-147407, JP-A No. 1-145203), and (7) a method which, in order to improve the vulcanization molding, uses composite cords in which the cords wound in spirals around the outermost layer are twisted together with cords having a high modulus of elasticity and cords having a low modulus of elasticity, the stress-strain curve of the composite cords having a point of inflection (e.g., JP-A No. 1-247204). Many other methods are known such as (8) a method to improve the noise of the tire formed by above method (7) by limiting the fiber materials which are twisted together (JP-A No. 6-305304), and (9) a method in which organic fibers are used in reinforcing layers at both side portions of the belt layers in the radial direction of the tire (JP-A No. 6-115312), and the like. In all of the methods described above, whether explicitly disclosed in these publications or not, the tension of the belt portion is slightly strengthened, and therefore, there is a slight reduction in road noise.

However, in method (1), even if road noise can be reduced by softening the tread rubber, this method is not practical because wear resistance markedly decreases and the handling stability deteriorates greatly. In method (2), even though the tension of the belt layers of the tire can be increased, the transverse rigidity and the cornering performance of the tire deteriorates, and portions other than the tread portion contact the ground such that the external appearance of the tire is not satisfactory. Further, in method (3), although there is a slight improvement in durability at high speeds and a slight reduction in road noise, this improvement and this reduction are only slight and therefore are not satisfactory. Methods (4) and (5), which are applied examples of method (3), have the same aforementioned effects as or better effects than method (3), but the rate of improvement brought about by methods (4) and (5) is slight, and further, there is not sufficient durability at high speeds. It is difficult to manufacture tires by using method (6), and further, method (6) results in a deterioration in handling stability. Because there is a point of inflection in the stress-strain curve in methods using composite cords such as methods (7) and (8), the reduction in road noise in the large range of 100 to 500 Hz is insufficient because the performance of the cords differs at large inputs and small inputs. Moreover, these methods are not preferable from a practical standpoint because the effect of the composite cords on the reduction of road noise is highly dependent on the speed of the vehicle. JP-A No. 6-115312 which discloses method (9) does not specify the cord characteristics, and although there is a slight reduction in road noise with method (9), the reduction is insufficient. Further, because the cord characteristics are not completely generated by the tire characteristics, the reduction in road noise is insufficient. When cords having a high modulus of elasticity and formed from an ordinary aromatic polyamide (such as the cords of the only Example of JP-A No. 6-115312 which discloses this method (9)) are wound in spirals, the road noise cannot be reduced sufficiently, and the handling stability greatly deteriorates.

As described above, there are no conventional tires having sufficient durability at high speeds and handling stability (which can be considered to be essential factors of the required performances of current tires), and also able to greatly reduce road noise.

SUMMARY OF THE INVENTION

An object of the present invention is to provide a radial tire which has improved durability at high speeds, excels in handling stability, and markedly reduces road noise.

In order to achieve the above object, the inventors of the present invention conducted thorough studies focusing on the relationships between the physical properties of the fiber cords used in the belt reinforcing layers and the temperature, tension, dynamic input and the like applied to the belt reinforcing layer cords at the time the tire is manufactured and the time the tire is used on a traveling vehicle. The studies of the present inventors clarified what physical properties of the belt reinforcing layers and the fiber cords are closely related to the respective required characteristics of the tire. More specifically, the inventors discovered, by means which will be described hereinafter, that all of the aforementioned required characteristics could be achieved simultaneously, and thus arrived at the present invention.

The present invention is a radial tire having a pair of bead portions; a carcass which is toroidal and extends across the bead portions; a tread portion positioned at a crown portion of the carcass; and sidewall portions of the carcass, and at least one belt reinforcing layer is disposed at the entire tread portion and/or at both end portions of the tread portion at an outer peripheral side of at least two belt layers which are disposed at an inner side of the tread portion, the belt reinforcing layers being formed by narrow, rubber-coated strips, which include a plurality of fiber cords, being wound endlessly in spirals so that the fiber cords are substantially parallel in a circumferential direction of the tire, wherein the belt reinforcing layer cords comprise organic fiber cords, the elongation of the organic fiber cords under 1.4 g/d load at 50±5° C. is less than or equal to 2.7%, and the elongation under 0.7 g/d load at 170±5° C. is 1.5 to 6.0%.

The material of the organic fiber cords used in the present invention is not particularly limited as long as it satisfies all of the above-described physical properties. However, polyethylene-2,6-naphthalate, polyethylene terephthalate, aromatic polyamide, nylon and the like can be used. Among these, polyethylene-2,6-naphthalate and polyethylene terephthalate are preferable, and polyethylene-2,6-naphthalate is more preferable.

For example, for the polyethylene-2,6-naphthalate, a polymer which is 85 mol % or more polyethylene-2,6-naphthalate can be used. This polymer can be synthesized by known methods, such as the method disclosed in JP-A No. 5-163612, column 2, line 26 through column 3, line 21. The base filament can be manufactured in accordance with the description given in column 4, line 7 through column 5, line 35 of JP-A No. 5-163612. This polymer can be synthesized by either ordinary molten polymerization or solid phase polymerization.

For example, 30% or more of the total number of deniers of the belt reinforcing layer cords used in the present invention are polyethylene-2,6-naphthalate fibers. From the standpoint of the effects of the invention, it is preferable that 45% or more of the total number of deniers are polyethylene-2,6-naphthalate fibers. Accordingly, less than 70%, or preferably less than 55%, of the total number of deniers of the belt reinforcing layer cords are other organic fibers. The "total number of deniers of a cord" means the number of deniers of a yarn (an untwisted cord) which comprises a plurality of filaments. For example, polyethylene-2,6-naphthalate fiber cords alone or polyethylene-2,6-naphthalate fiber cords together with other organic fiber cords can be used for the belt reinforcing layer cords of the present invention. Further, the belt reinforcing layer cords may be, for example, cords formed by using other organic fibers together with polyethylene-2,6-naphthalate fibers.

For example, a polymer having 85 mol % or more polyethylene terephthalate can be used. Examples of a method of preparing the polyethylene terephthalate polymer and a method of manufacturing the base filament will be described later.

For example, polyethylene terephthalate fiber cords alone or polyethylene terephthalate fiber cords together with other organic fiber cords can be used for the belt reinforcing layer cords.

In the radial tire of the present invention, the belt reinforcing layers are disposed at the entire tread portion or at both end portions of the tread portion, at the outer circumferential side of the belt layers. The belt reinforcing layer is formed by a narrow, rubber-coated strip, which includes a plurality of fiber cords, being wound endlessly in a spiral such that the cords are substantially parallel in the circumferential direction of the tire. Further, the cords of the belt reinforcing layer are formed from organic fiber cords. At 50±5° C. and under a 1.4 g/d load, the elongation of the fiber cords is less than or equal to 2.7%, preferably less than or equal to 2.0%, and more preferably less than or equal to 1.8%, and at 170±5° C. and under a 0.7 g/d load, the elongation of the fiber cords is 1.5 to 6.0%, preferably 1.5 to 3.5%, and more preferably 2.0 to 3.0%. In this way, the belt reinforcing layers are wound in spirals at the entire tread portion and/or at positions near the side portions of both ends of the tread portion. The modulus of the cords used in such a reinforcing layer increases. By placing the barrier-shaped reinforcing layers, which have high tension in the circumferential direction of the tire, at the entire tread portion and/or at positions near the side portions of both ends of the tread portion, the tensile rigidity of the tread portion in the circumferential direction increases, and the so-called retainer band effect of the belt improves. Therefore, it is difficult for vibrations caused when the tire travels over large and small protrusions and recesses in the road surface to be transmitted to the tread surface, and accordingly, vibrations transmitted from the tire side portions to the rim portion to the wheel to the vehicle interior are reduced, i.e., road noise is reduced.

If the belt reinforcing layers are not wound spirally, a joint portion of the layer in the circumferential direction of the tire will be formed. The circumferential direction tension will improve, but more importantly, there will be a deviation between the upper and lower portions of the belt reinforcing layer at the joint portion, such that even if the physical properties of the cord are limited as described above, the effects will not be achieved and the uniformity will markedly deteriorate due to the joints.

In the present invention, the organic fiber cords of the belt reinforcing layers have an elongation of less than or equal to 2.7% under a 1.4 g/d load at the temperature the belt reinforcing layer receives during normal traveling on the tire, i.e., at 50±5° C. In this way, the vibrations of the belts caused by projections and recesses in the road surface can be reduced. When the elongation exceeds 2.7%, vibrations of the belts cannot be completely suppressed, and it becomes difficult for the road noise reduction effect to be realized. Further, it is preferable that a ratio $N_1/N_2$ of the fiber cords of the belt reinforcing layers is 0.8 to 1.3, wherein $N_1$ is the slope of a tangent line at 1.4 g/d load of a stress-strain curve for 50±5° C., and $N_2$ is the slope of a tangent line at 0.25 g/d load of the stress-strain curve for 50±5° C. In this way, the uniformity of the barrier effect against the vibration input of the belts is maintained, and vibrations of the belt layers due to large inputs and vibrations caused by small inputs are suppressed equally well. For example, when $N_1/N_2$ is less than 0.8, the barrier effect against large inputs deteriorates, and the vibration reducing effect deteriorates. When $N_1/N_2$ exceeds 1.3, the barrier effect against small inputs deteriorates, and the vibration reducing effect deteriorates. As a result, vibrations are generated in the entire tread portion, and the road noise reducing effect deteriorates. The barrier effect against large inputs and small inputs, i.e., the road noise reducing effect, is influenced more by the ratio of the absolute value of the modulus of the reinforcing layer cords under a large load and the absolute value of the modulus of the reinforcing layer cords under a small load, than the barrier effect is influenced by the absolute values themselves.

The elongation of the fiber cords of the belt reinforcing layer under 0.7 g/d load at the temperature received by the cords during vulcanization molding of the tire, i.e., 170±5° C., must be 1.5 to 6.0%. During the process of manufacturing a tire, when a green tire is set in a vulcanization mold and is filled with internal pressure so as to be pushed against the inner surfaces of the mold, in order for the respective portions of a tread, which have different rates of expansion, to have sufficient elongation so as to be fit tightly against the interior of the mold, the elongation of the cords of the belt reinforcing layers wound in spirals must be 1.5 to 6.0%, which allows the tread to conform to the vulcanization mold. In this way, the vulcanization moldability of the tire is satisfactory, the properties of the belt reinforcing layers are uniform, and the ground contactability is uniform. Therefore, the tire excels in low road noise, handling stability, and irregular wear resistance. At high temperatures such as temperatures of 150 to 180° C. at the time of vulcanization, the organic fiber cords have sufficient elongation, and for the manufactured tire, the organic fiber cords have the properties of a high modulus of elasticity and the belt layers being maintained strong, and therefore, the manufactured tire exhibits the desirable effects listed above. Here, an elongation at 0.7 g/d load is used because the average tension applied within the vulcanization mold to one fiber cord of the belt reinforcing layers wound spirally is generally about 0.7 g/d. When the elongation is less than 1.5% as in the case of an ordinary aromatic polyamide cord having a high modulus of elasticity, as can be understood from the above explanation, sufficient elongation of the tread within the vulcanization mold cannot be achieved, and the vulcanization molding is unsatisfactory. The ground contactability of the tire is non-uniform, the road noise reducing effect is insufficient, and the handling stability and the like also deteriorate. Further, when the elongation exceeds 6.0%, after the tire has been removed from the vulcanization mold, during post-cure inflation, the circumferential direction elongation of the tread portion increases, and durability at high speeds deteriorates.

A fiber cord of the belt reinforcing layer is obtained by ply-twisting base filaments and then cable-twisting the resultant twisted cord in the opposite direction with two or three fiber cords. The twist coefficient R is preferably 0.20 to 0.72, and more preferably 0.20 to 0.50. Here, R is defined as $R = N \times (0.139 \times D/\rho)^{1/2} \times 10^{-3}$, wherein N is the number of twists of the cord (the number of times the cord is twisted per 10 cm), D is the total number of deniers of the cord, and $\rho$ is the specific gravity of the cord. Because the cord has the proper degree of bundling, a high level road noise reducing effect can be achieved. If the twist coefficient R is less than 0.20, the adhesion between the cord and the rubber deteriorates. If the twist coefficient R is greater than 0.72, the elongation increases and the initial modulus decreases. As a result, the retainer band effect of the belt reinforcing layers deteriorates.

Further, the tan $\delta$ of the tread base rubber of the tread portion is preferably 0.02 to 0.08, and optimally 0.03 to 0.05.

In the present invention, the low rolling resistance of a radial tire using the above-described fiber cords in the belt reinforcing layer slightly deteriorates. However, by using the above-described tread rubber having low hysteresis loss, the low rolling resistance of the tire improves and also, the road noise is reduced. Further, the durability at high speeds improves, and a high level of handling stability is obtained.

The tan $\delta$ of the side rubber of the sidewall portions is preferably 0.02 to 0.15, and more preferably 0.05 to 0.09. The low rolling resistance of the tire can thereby be improved even more.

When a tread base rubber and a side rubber having a low tan $\delta$ are used in a tire which aims for low fuel costs, even if the rolling resistance can be reduced, the road noise reducing effect tends to deteriorate. However, in the present invention, due to the combination of the above-described rubber and the above-described fiber cords of the belt reinforcing layers, a great reduction in road noise can be achieved.

The belt reinforcing layer of the radial tire of the present invention is formed by a strip which includes organic fiber cords, e.g., polyethylene-2,6-naphthalate fiber cords, being wound in a spiral. Because these fiber cords have all of the above-described properties, even if an ordinary cord heat treatment and an ordinary tire manufacturing method are used, the moldability within the vulcanization mold is satisfactory. The handling stability and the irregular wear resistance of the tire are excellent, and road noise is greatly decreased. Conventionally, it has been difficult to reduce road noise in a wide frequency band, in particular, in a high frequency band such as 300 to 500 Hz. This object of the reduction of road noise in a wide frequency band has been achieved firstly by the radial tire of the present invention which utilizes organic fiber cords such as polyethylene-2,6-naphthalate fiber cords. The many effects achieved by the radial tire of the present invention become even more clear when the fiber cords of the present invention are compared with other fiber cords to be described hereinafter which are also used for belt reinforcing layers.

When ordinary nylon 66 fiber cords or nylon 46 fiber cords or the like are used, the road noise of the tire (the noise within the vehicle) decreases slightly as compared with a case in which no belt reinforcing layers are used. This level of road noise reduction is not satisfactory.

When fiber cords having a high modulus of elasticity, such as ordinary aromatic polyamide fiber cords, carbon fiber cords, glass fiber cords and the like, are used, the vulcanization moldability is unsatisfactory as described above. Road noise in the wide frequency band of 100 to 500 Hz and in the relatively high frequency band of 300 to 500 Hz, cannot be reduced sufficiently. Further, the ground contactability is not uniform, and the handling stability and the irregular wear resistance greatly deteriorate.

When ordinary aromatic polyamide/nylon composite fiber cords are used, because the stress-strain curve is non-linear, the road noise reduction effect deteriorates due to large and small inputs from the road surface and due to the traveling speed. Accordingly, such cords are not practical.

BRIEF DESCRIPTION OF THE DRAWINGS

FIG. 1 is a sectional view illustrating an embodiment of a radial tire of the present invention.

FIG. 2 is a sectional view illustrating another embodiment of a radial tire of the present invention.

FIG. 3 is a sectional view illustrating yet another embodiment of a radial tire of the present invention.

EXAMPLES

Figure 4:
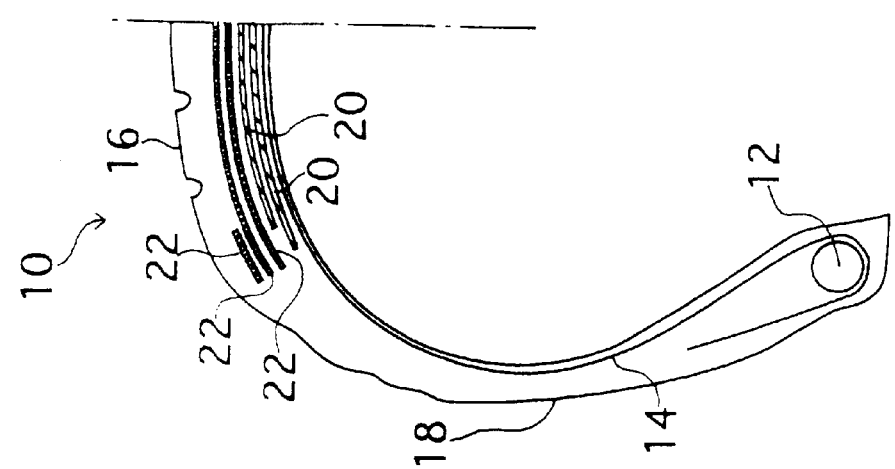
FIG. 4 is a sectional view illustrating still another embodiment of a radial tire of the present invention.

FIGS. 1 through 6 illustrate a radial tire 10 which includes a carcass 14, a tread portion 16, sidewall portions 18 of the carcass 14, at least two belt layer 20, and at least one belt reinforcing layer 22. The carcass 14 is folded over around a bead core 12 from the inner side of the tire to the outer side of the tire to engage the outer side. The tread portion 16 is positioned at the crown portion of the carcass 14. The belt layers 20 are disposed at the inner side of the tread portion 16. The belt reinforcing layers 22 are disposed at the outer peripheral side of the belt layers 20 at the entire tread portion and/or at both end portions of the tread portion. The belt reinforcing layer 22 is a narrow, rubber-coated strip including a plurality of fiber cords which is wound endlessly in a spiral so that the cords are substantially parallel (0° to 5°) in the circumferential direction of the tire. It is preferable that belt reinforcing layers 22 jut out at the radial direction outer side of the belt layers 20. In the carcass 14, fiber cords are disposed substantially orthogonally to the circumferential direction of the tire. The carcass 14 is formed of at least one layer. In the belt layer 20, non-elongatable cords, such as aromatic polyamide fiber cords and steel cords, are disposed at an angle of 10° to 30° with respect to the circumferential direction (or the equatorial plane of the tire). At least two belt layers 20 are provided such that the cords thereof intersect in different directions.

Figure 5:
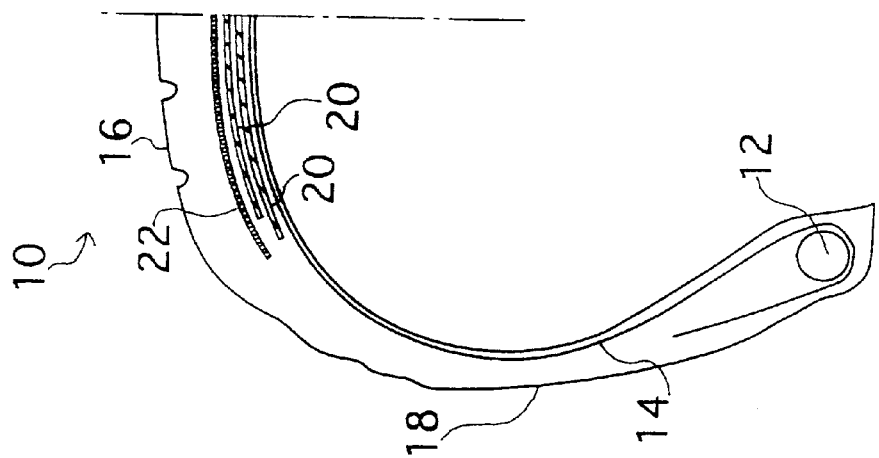
FIG. 5 is a sectional view illustrating another embodiment of a radial tire of the present invention.
Figure 6:
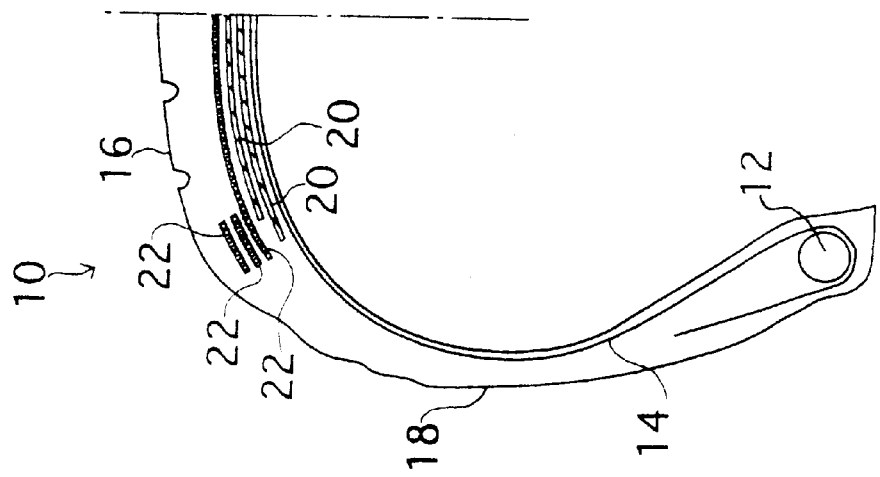
FIG. 6 is a sectional view illustrating still another embodiment of a radial tire of the present invention.

FIGS. 1 through 6 respectively illustrate examples of arrangements of the belt reinforcing layers 22. FIG. 1 is a sectional view of a tire in which one belt reinforcing layer 22 is wound uniformly at the entire tread portion 16 at the outer peripheral side of the belt layer 20, and a second belt reinforcing layer 22 is wound at each of the side end portions at the outer peripheral side of the previous belt reinforcing layer 22. FIG. 2 is a sectional view of a tire in which one belt reinforcing layer 22 is wound at each end portion of the tread portion 16 (at the outer peripheral side of the belt layers 20). FIG. 3 is a sectional view of a tire in which two belt reinforcing layers 22 are wound at each end portion. FIG. 4 is sectional view of a tire in which one belt reinforcing layer 22 is wound at the entire tread portion and two additional belt reinforcing layers 22 are wound at each end portion. FIG. 5 is a sectional view of a tire in which one belt reinforcing layer 22 is wound at the entire tread portion. FIG. 6 is a sectional view illustrating a tire in which two belt reinforcing layers 22 are wound at the entire tread portion and and additional one is wound at each end portion. The arrangement of the belt reinforcing layers is not limited to the above-described examples. Structures such as those illustrated in, for example, FIGS. 2 and 3 are used preferably, due their light weight, for ordinary passenger vehicles. Structures such as those illustrated in FIGS. 1 and 4 through 6 are used preferably, due to their reinforcing effect, in heavy weight passenger vehicles and in sports cars or the like in which high speed performance is of great importance.

(1) The tires used in Examples 1 through 15 and Comparative Examples 1 through 5, which will be described later, are as follows. The tire size is a 205/65R15 tubeless structure. In the manufacturing process, the tire is vulcanized at 170° C. for 13 minutes, and then is inflated to a post-cure inflation internal pressure of 2.5 kg/cm² for 26 minutes.

Two carcass layers are used, each carcass layer being formed by using polyethylene terephthalate cords of 1000D/2 (two cords, each of 1000 deniers) with a number of twists (ply-twists×cable-twists) of 47×47 (times/10 cm). The thread count is 55.0 cords per 5 cm.

The belt layer has two steel cord belts of a 1×5×0.23 structure. The embedding angle of the two steel cords is 26° respectively to the left and right with respect to the circumferential direction, and the number of embedded cords is 40.0 cords per 5 cm.

The belt reinforcing layers are wound spirally at the outer side of the belt layers at an angle of 0° to 5° with respect to the circumferential direction. The belt reinforcing layers are arranged as illustrated in FIG. 1. Here, the single belt reinforcing layer which is wound at the entire tread portion is wound 5 mm wider at the radial direction outer side ends of the belt layer. Further, each of the belt reinforcing layers at the outer side end portions is wound such that the width of each of these layers is 30 mm. The belt reinforcing layers are formed above the belt layers by the above-described method by using narrow strips of 5 to 20 mm.

The polyethylene-2,6-naphthalate fiber cords used in the belt reinforcing layers are obtained in the following manner.

Resin chips of the polyethylene-2,6-naphthalate (intrinsic viscosity 0.72) obtained by the previously-described method are substantially melt spun. The spinning speed is 600 m/minute. A 44 cm long heating tube having an ambient temperature of 340° C. is set directly beneath the spinneret. The melt-spun non-stretched filament is wound around an oiling roller so that a lubricant is applied thereto. Next, after 1% pretension is applied to the resultant non-stretched filament, the filament is subject to shrinkage heat setting between a heat roller of 227° C. and a non-heated roller at a relaxation rate of 2.2%. The filament is wound around the roller at 300 m/minute. The temperature of the spinning machine is optimally 300 to 315° C. at the first half of the extruder which melts the polymer, and thereafter, is optimally 318° C. until the filament is discharged from the spinneret. Further, cooling hardening at a relative humidity of 65% and a temperature of 25° C. for a length of 35 cm may be carried out after the filament has passed through the heating tube. In this way, a polyethylene-2,6-naphthalate base filament is obtained.

The base filament is adjusted so that the twist coefficient R becomes 0.20 to 0.72, and a twisted cord is obtained. This twisted cord is subjected to adhesive application and heat treatment as follows.

The twisted cord is immersed in a resorcinol-formaldehyde resin latex type adhesive. In the drying zone, the processing temperature is 170° C. and the processing time is 60 to 160 seconds. Further, in the heat setting zone and the normalizing zone, the processing temperature is 250 to 270° C. and the processing time is 60 to 160 seconds. Moreover, the cord tension in the heat setting zone is set to 0.4 to 1.1 g/d and the cord tension in the normalizing zone is set to 0.03 to 0.50 g/d. The above conditions are disclosed in Example 1 of Japanese Patent Application Publication JP-B No. 63-12503. Further, the adhesive may be a reactive adhesive, e.g., an epoxy resin adhesive or the like, which is applied in two steps. Here, after adhesion heat processing, it is preferable that the elongation (%) of the cord under a load of 2.25 g/d (in accordance with the methods of JIS L1017) is adjusted to less than or equal to 3.5%.

The polyethylene terephthalate fiber cords used in the belt reinforcing layers are obtained in the following manner.

First, the method of preparing the polyethylene terephthalate polymer will be described hereinafter.

2 mol of terephthalic acid, 3 mol of ethylene glycol, and antimony (III) oxide as a catalyst ($2 \times 10^{-4}$ mol with respect to the terephthalic acid) were placed in a reaction vessel equipped with a stirrer. After sufficient substitution with nitrogen gas, the interior of the reaction vessel was pressurized to 1.8 kg/cm$^2$ with nitrogen gas, and the reaction was carried out at 240° C. After a substantially theoretical quantity of water and by-products were removed from the system, polycondensation reaction was carried out at 40 mm Hg and 255° C. for 60 minutes, and at 15 mm Hg and 270° C. for 60 minutes, and at 1 mm Hg and 275° C. until a predetermined molecular weight was reached. After the reaction was completed, the resultant product was immediately cooled in ice water. After the polycondensation reaction was completed, the sample which had been immediately cooled in ice water was cut to a 2 mm to 3 mm pellet shape. 5 g of this sample was placed in a 100 ml round flask. After reducing the pressure (0.1 mm Hg), the round flask was placed in an oil bath, and crystallization and pre-drying were carried out for two hours at 160° C. at a mixing speed of 30 rpm. Thereafter, solid state polymerization was carried out for a predetermined time at a mixing speed of 30 rpm at the temperature of the sample (melting point −18° C.). For a polymer having a polymer intrinsic viscosity of 0.60 (weight average molecular weight=$5.5 \times 10^4$) at the time of polymerization initiation, solid state polymerization was carried out for about 7 hours until the intrinsic viscosity was 0.98 (weight average molecular weight=$7.5 \times 10^4$ level) at 237° C.

The resultant polyethylene terephthalate (intrinsic viscosity=0.98) obtained by solid state polymerization was immediately cooled in an inert gas atmosphere at 10 to 60° C. (e.g., 25° C.) under the spinneret, and was spun and taken up at a spinning speed of 1500 to 6000 m/min (e.g., 4200 m/min). Then, stretching at a draw ratio of 1.2 to 2.30 (e.g., 1.31) was carried out so as to form a polyethylene terephthalate base filament.

The base filament was adjusted so that the twist coefficient R was 0.20 to 0.72, and a twisted cord was obtained. The twisted cord was subjected to adhesive application and heat processing in accordance with the following conditions.

The adhesive was prepared as follows. Resorcinol-polysulfide and resorcinol excess resorcinol-formaldehyde condensation resin were mixed in a solid content ratio of 20:100. 18 parts of the solid content were removed therefrom, and 9 parts of 28% ammonia water were added to this removed solid content. Water was added and the solid content was completely dissolved such that the entire mixture became 50 parts. To this solution was added 50 parts of a resorcinol-formaldehyde condensation resin/latex (RFL). This RFL was prepared from the following compositions, and was aged for 48 hours or more.

| | |
|---|---|
| water | 518.8 (wt. pts.) |
| resorcinol | 11.0 |
| formaldehyde (37%) | 16.2 |
| ammonium hydroxide (28%) | 10.0 |
| vinylpyridine-styrene-butadiene copolymer latex (41%) | 244.0 |

The twisted cord was immersed in this adhesive. In the drying zone, the processing temperature was set to 170° C. and the processing time was set to 60 to 160 seconds. In the heat setting zone and the normalizing zone, the processing temperature was set to 250 to 265° C. and the processing time was set to 60 to 170 seconds. Moreover, the tension in the heat setting zone was set to 0.4 to 1.1 g/d, and the tension in the normalizing zone was set to 0.03 to 0.50 g/d. In the annealing zone which follows the normalizing zone, the processing temperature was set to 150 to 180° C., the processing time was set to 30 to 170 seconds, and the cord tension was set to 0.01 to 0.70 g/d. In this way, a cord which was subjected to a predetermined adhesive processing was obtained.

The tread base rubber of the present invention having a tan$\delta$ of 0.02 to 0.08 was formed by compounding 100 wt. pts. of natural rubber (NR), 15 to 40 wt. pts. of carbon black and 1 to 3 wt. pts. of sulfur in an optimal combination with optimal amounts of oil, antioxidants, vulcanizing accelerators, and processability improving agents.

The side rubber of the present invention having a tan$\delta$ of 0.02 to 0.15 was formed by compounding 100 wt. pts. of a blend of natural rubber (NR) and butadiene rubber (BR) (NR/BR=60 to 20 wt. pts. / 40 to 80 wt. pts.), 20 to 50 wt. pts. of carbon black, and 1 to 2 wt. pts. sulfur in an optimal combination with optimal amounts of oil, antioxidants, vulcanizing accelerators, and processability improving agents.

(2) The measuring methods and test methods used in Examples 1 through 15 and Comparative Examples 1 through 5 were as follows.

(A) Measurement of elongation under a load of 0.7 g/d at 170±5° C.

A load of 0.0167 g/d was applied to a cord at 20 to 30° C. (room temperature). The ambient temperature of the cord was raised at a speed of 80° C./min until the temperature reached 170±5° C., and the cord was left in this state for 10 minutes. Thereafter, the cord was pulled at a speed of 30 mm/min until the load acting thereon reached 0.7 g/d. In this state, the length of the cord after it crept for 10 minutes was measured. This length was compared with the length of the cord at room temperature when the 0.0167 g/d load was applied thereto. The difference in the length of the cord after creeping and the length of the cord when the load of 0.0167 g/d was applied thereto was divided by the length of the cord at room temperature when the 0.0167 g/d load was applied thereto, so as to obtain the elongation (%) under a load of 0.7 g/d at 170±5° C. Note that the length of the initial sample was 250 mm.

(B) Measurement of elongation under a load of 1.4 g/d at 50±5° C.

A load of 0.0167 g/d was applied to a cord at 20 to 30° C. (room temperature). The ambient temperature of the cord was raised at a speed of 5° C./min until the temperature reached 50±5° C., and the cord was left in this state for 5 minutes. Thereafter, the cord was pulled at a speed of 300 mm/min until it broke. A stress-strain curve was drawn, and the elongation at a stress of 1.4 g/d was read from the stress-strain curve. This value was the elongation under a load of 1.4 g/d at 50±5° C.

(C) Measurement of the ratio $N_1/N_2$, wherein $N_1$ is the slope of a tangent line at 1.4 g/d load of a stress-strain curve for 50±5° C., and $N_2$ is the slope of a tangent line at 0.25 g/d load of a stress-strain curve for 50±5° C.

Tangent lines were drawn at the 1.4 g/d load point and the 0.25 g/d load point of the stress-strain curve prepared in above (B). The loads (g/d) per elongation unit were respectively $N_1$ and $N_2$. These values were the slopes of the tangent lines, and the ratio $N_1/N_2$ was determined by dividing $N_1$ by $N_2$.

(D) Measurement of tanδ tanδ at a temperature of 60° C., a distortion of 1%, and a frequency of 50 Hz was measured by using a viscoelasticity measuring device (manufactured by Toyo Seiki Seisakusho).

(E) Road noise test

Four 205/65R15 test tires having an internal pressure of 2.0 kgf/cm² and rim size 6J-15 were installed on a 2000 cc sedan-type automobile. Two passengers rode in the vehicle which traveled at a speed of 60 km/h along a test course for road noise evaluation. A sound-gathering microphone was installed at the center of the seat back of the driver's seat, and all sound pressures (decibels) of 100 to 500 Hz and 300 to 500 Hz were measured. These values for the control tire of Comparative Example 1 was given an index value of 100. A higher value here indicates a better road noise evaluation.

(F) Handling stability test

Four 205/65R15 test tires having an internal pressure of 2.0 kgf/cm² and rim size 6J-15 were installed on a 2000 cc sedan-type automobile, and the vehicle traveled over a test course for handling stability evaluation.

A feeling test in an actual vehicle was performed at speeds of 60 to 200 km/hr. The following four aspects were evaluated and given grades from 1 to 10 points: (i) straight-traveling stability, (ii) turning stability, (iii) feeling of rigidity, (iv) handling. The points from these four aspects were averaged to determine the handling stability score. This evaluation was carried out by two specialist drivers. Their two scores were averaged, and this value for the control tire of Comparative Example 1 was given an index value of 100. A higher value here is more preferable.

(G) Test of durability at high speeds

Evaluation of the durability at high speeds of the tire was carried out by using the step-speed method in accordance with test method No. 109 of the U.S. standards FMVSS. More specifically, the speed was increased each 30 minutes until trouble occurred. The speed (km/h) at the time the trouble occurred and how long (minutes) the tire had been running at that speed were measured. This value for the control tire of Comparative Example 1 was given an index value of 100. A higher value here is more preferable.

(F) Rolling resistance test

A rotating drum having a smooth steel surface, an outer diameter of 1707.6 mm, and a width of 350 mm was used to measure and evaluate the rolling resistance by a coasting method by rotating the tire at speeds of 0 to 180 km/hr under a load of 300 kg. The speed was measured each 20 km/hr, and the rolling resistance was evaluated by the average value of the respective speeds. This value for the control tire of Comparative Example 1 was given an index value of 100. Higher values indicate better rolling resistance (lower rolling resistance).

Example 1

Polyethylene-2,6-naphthalate (PEN) cords were used as the belt reinforcing layer fiber cords. The denier structure was 1500D/2 (i.e., two ply-twisted cords, each cord having a total number of deniers of 1500 deniers). The cord had 39 times/10 cm ply-twists, 39 times/10 cm cable-twists (denoted by "39×39", which is the number of ply-twists (times/10 cm)×the number of cable-twists (times/10 cm)), and a twist coefficient of 0.68. The elongation under 1.4 g/d at 50±5° C. was 2.0%, and the elongation under 0.7 g/d at 170±5° C. was 3.0%. The ratio $N_1/N_2$ (wherein $N_1$ is the slope of a tangent line at 1.4 g/d load of a stress-strain curve for 50±5° C., and $N_2$ is the slope of a tangent line at 0.25 g/d load of the stress-strain curve for 50±5° C.) was 0.90. The tanδ of the tread base rubber and the side rubber were 0.08 and 0.15, respectively.

A radial tire having the above-described material was evaluated with respect to respective performances, such as road noise, rolling resistance, handling stability, durability at high speeds and the like. The results of the evaluation are shown in Table 1.

Examples 2–9

For Examples 2 through 9, the values of the respective elements of the PEN cords of Example 1 (the number of twists, the twist coefficient, elongation at 50±5° C. under 1.4 g/d load, elongation at 170±5° C. under 0.7 g/d load, $N_1/N_2$) and the tanδ values of the tread base rubber and the side rubber were changed as shown in Table 1. The performances of tires obtained in the same way as in Example 1 were evaluated, and the results are listed in Table 1.

Examples 10–15

The belt reinforcing layer fiber cords of Example 10 were composite, hybrid cords of PEN cords and nylon 66 (NY) cords. A 1500 D PEN cord of 27 times/10 cm ply-twists and a 1260 D NY cord of 27 times/10 cm ply-twists formed the composite cord having 27 times/10 cm cable-twists.

The fiber cords of Example 11 were composite, hybrid cords of PEN cords and polyethylene terephthalate (PET) cords. A 1500 D PEN cord of 39 times/10 cm ply-twists and a 1500 D PET cord of 39 times/10 cm ply-twists formed the composite cord having 39 times/10 cm cable-twists.

The fiber cords of Example 12 were composite, hybrid cords of PEN cords and rayon (RAY) cords. A 1500 D PEN cord of 39 times/10 cm ply-twists and a 1650 D RAY cord of 39 times/10 cm ply-twists formed the composite cord having 39 times/10 cm cable-twists.

The fiber cords of Example 13 were doubling cords having PEN filaments and NY filaments in each yarn. The PEN filaments and NY filaments were used in a ratio of 2:1 (66.7% of the total number of deniers are PEN fibers) so as to obtain a 1500 D doubling cord having 39 times/10 cm ply-twists. Two of these doubling cords were cable-twisted at 39 times/10 cm so as to form the doubling cord of Example 13.

The fiber cords of Example 14 were obtained in the same way as the fiber cords of Example 13, except that the PEN filaments and the NY filaments were used in a ratio of 1:1 (50% of the total number of deniers were PEN fibers).

The fiber cords of Example 15 were PET cords which had 1500 D/2 deniers and whose twisting number was cable×ply (times/10 cm) 22×22.

For Examples 10 through 15, the values of the respective elements of the fiber cords of Example 1 (the twist coefficient, the elongation at 50±5° C. under 1.4 g/d load, the elongation at 170±5° C. under 0.7 g/d load, $N_1/N_2$) were changed as shown in Table 2. The performances of tires obtained in the same way as in Example 1 were evaluated, and the results thereof are listed in Table 2.

Comparative Examples 1 through 5

The fiber cords of Comparative Example 1 were NY cords which had 1260 D/2 deniers and whose twisting number was cable×ply (times/10 cm) 39×39.

The fiber cords of Comparative Example 2 were PET cords which had 1500 D/2 deniers and whose twisting number was cable×ply (times/10 cm) 39×39.

The fiber cords of Comparative Example 3 were aromatic polyamide (ARM) cords which had 1500 D/2 deniers and whose twisting number was cable×ply (times/10 cm) 39×39.

The fiber cords of Comparative Example 4 were composite, hybrid cords of ARM cords and NY cords. A 1500 D ARM cord having 22 times/10 cm ply-twists and a 1500 D NY cord having 11 times/10 cm ply-twists formed the composite cord having 22 times/10 cm cable-twists.

The fiber cords of Comparative Example 5 were PEN cords which had 1500 D/2 deniers and whose twisting number was cable×ply (times/10 cm) 22×22.

For Comparative Examples 1 through 5, the values of the respective elements of the fiber cords of Example 1 (the twist coefficient, the elongation at 50±5° C. under 1.4 g/d load, the elongation at 170±5° C. under 0.7 g/d load, $N_1/N_2$) were changed as shown in Table 3. The performances of tires obtained in the same way as in Example 1 were evaluated, and the results thereof are listed in Table 3.

TABLE 1

| examples | | 1 | 2 | 3 | 4 | 5 | 6 | 7 | 8 | 9 |
|---|---|---|---|---|---|---|---|---|---|---|
| cords | fiber cord material | PEN | PEN | PEN | PEN | PEN | PEN | PEN | PEN | PEN |
| | denier structure | 1500/2 | 1500/2 | 1500/2 | 1500/2 | 1500/2 | 1500/2 | 1500/2 | 1500/2 | 1500/2 |
| | number of twists ply × cable (times/10 cm) | 39 × 39 | 39 × 39 | 39 × 39 | 12 × 12 | 22 × 22 | 22 × 22 | 22 × 22 | 22 × 22 | 22 × 22 |
| | twist coefficient | 0.68 | 0.68 | 0.68 | 0.21 | 0.39 | 0.39 | 0.39 | 0.39 | 0.39 |
| | elongation(%) under 1.4 g/d load at 50 ± 5° C. | 2.0 | 1.3 | 1.9 | 1.0 | 1.3 | 1.3 | 1.3 | 1.9 | 1.8 |
| | elongation (%) under 0.7 g/d load at 170 ± 5° C. | 3.0 | 2.2 | 1.5 | 1.5 | 2.8 | 2.8 | 2.8 | 3.3 | 2.5 |
| | $N_1/N_2$ | 0.9 | 0.9 | 1.0 | 1.2 | 1.2 | 1.1 | 1.1 | 1.0 | 1.0 |
| rubber | tread base rubber tan δ | 0.08 | 0.08 | 0.08 | 0.08 | 0.08 | 0.04 | 0.04 | 0.08 | 0.08 |
| | side rubber tan δ | 0.15 | 0.15 | 0.15 | 0.15 | 0.15 | 0.15 | 0.07 | 0.15 | 0.15 |
| tire performance | 100–500 Hz road noise (index) | 111 | 113 | 111 | 116 | 115 | 116 | 117 | 112 | 113 |
| | 300–500 Hz road noise (index) | 117 | 122 | 121 | 122 | 124 | 130 | 130 | 121 | 123 |
| | rolling resistance (index) | 95 | 94 | 94 | 92 | 94 | 100 | 102 | 97 | 94 |
| | handling stability (index) | 100 | 99 | 97 | 97 | 101 | 101 | 101 | 102 | 100 |
| | durability at high speeds (index) | 105 | 108 | 102 | 105 | 106 | 107 | 108 | 103 | 112 |

TABLE 2

| examples | | 10 | 11 | 12 | 13 | 14 | 15 |
|---|---|---|---|---|---|---|---|
| cords | fiber cord material | PEN/NY | PEN/PET | PEN/RAY | PEN/NY | PEN/NY | PET |
| | denier structure | 1500/1260/2 | 1500/2 | 1500/1650/2 | 1500/2 | 1500/2 | 1500/2 |
| | type of twisted cord | composite | composite | composite | doubling | doubling | — |
| | number of twists ply × cable (times/10 cm) | 27 × 27 | 39 × 39 | 39 × 39 | 39 × 39 | 39 × 39 | 22 × 22 |
| | twist coefficient | 0.53 | 0.68 | 0.68 | 0.71 | 0.71 | 0.38 |
| | elongation(%) under 1.4 g/d load at 50 ± 5° C. | 2.5 | 2.1 | 1.6 | 1.9 | 2.7 | 2.7 |
| | elongation(%) under 0.7 g/d load at 170 ± 5° C. | 3.5 | 3.0 | 3.1 | 2.7 | 2.0 | 5.8 |
| | $N_1/N_2$ | 0.9 | 1.1 | 1.0 | 1.2 | 1.0 | 1.3 |
| rubber | tread base rubber tan δ | 0.08 | 0.08 | 0.08 | 0.08 | 0.08 | 0.08 |
| | side rubber tan δ | 0.15 | 0.15 | 0.15 | 0.15 | 0.15 | 0.15 |
| tire performance | 100–500 Hz road noise (index) | 108 | 110 | 113 | 112 | 107 | 107 |
| | 300–500 Hz road noise (index) | 114 | 119 | 124 | 118 | 117 | 109 |
| | rolling resistance (index) | 102 | 97 | 94 | 96 | 101 | 102 |
| | handling stability (index) | 101 | 99 | 100 | 100 | 96 | 106 |
| | durability at high speeds (index) | 101 | 104 | 105 | 106 | 103 | 99 |

TABLE 3

| comparative examples | 1 | 2 | 3 | 4 | 5 |
|---|---|---|---|---|---|
| cords | | | | | |
| fiber cord material | NY | PET | ARM | ARM/NY | PEN |
| denier structure | 1260/2 | 1500/2 | 1500/2 | 1500/2 | 1500/2 |
| type of twisted cord | — | — | — | composite | — |
| number of twists ply × cable (times/10 cm) | 39 × 39 | 39 × 39 | 39 × 39 | 22/11 × 22 | 22 × 22 |
| twist coefficient | 0.68 | 0.68 | 0.68 | 0.21 | 0.39 |
| elongation (%) under 1.4 g/d load at 50 ± 5° C. | 4.2 | 3.0 | 1.2 | 1.9 | 2.3 |
| elongation (%) under 0.7 g/d load at 170 ± 5° C. | 4.5 | 5.0 | 0.8 | 6.2 | 6.4 |
| $N_1/N_2$ | 0.6 | 0.7 | 1.1 | 1.2 | 0.9 |
| rubber | | | | | |
| tread base rubber tan δ | 0.08 | 0.08 | 0.08 | 0.08 | 0.08 |
| side rubber tan δ | 0.15 | 0.15 | 0.15 | 0.15 | 0.15 |
| tire performance | | | | | |
| 100–500 Hz road noise (index) | 100 | 101 | 105 | 105 | 105 |
| 300–500 Hz road noise (index) | 100 | 101 | 105 | 104 | 104 |
| rolling resistance (index) | 100 | 95 | 90 | 94 | 95 |
| handling stability (index) | 100 | 101 | 86 | 89 | 96 |
| durability at high speeds (index) | 100 | 101 | 107 | 91 | 105 |

As can be seen from Tables 1 and 2, the radial tires of the present invention have high levels and a good balance of low rolling resistance, durability at high speeds and handling stability. Further, road noise was greatly reduced in a range extending from low frequencies to high frequencies.

As can be seen from Comparative Examples 1 and 2 in Table 3, when the elongation under 1.4 g/d load at 50±5° C. exceeds 2.7% (which does not fall within the scope of the present claims), the low rolling resistance property, durability at high speeds and handling stability are not high level, and the balance is not satisfactory. Further, road noise markedly deteriorates. As shown by Comparative Examples 3 through 5 in Table 3, when the elongation under 0.7 g/d load at 170±5° C. is less than 1.5% or greater than 6.0% (which does not fall within the scope of the present claims), the respective performances of the tire deteriorate, and the effects of the present invention cannot be achieved.

What is claimed is:

1. A radial tire comprising;

a pair of bead portions;

a carcass which is toroidal and extends across the bead portions;

a tread portion positioned at a crown portion of the carcass; and sidewall portions of the carcass, and at least one belt reinforcing layer is disposed at the entire tread portion and/or at both end portions of the tread portion at an outer peripheral side of at least two belt layers which are disposed at an inner side of the tread portion, the belt reinforcing layers being formed by narrow, rubber-coated strips, which include a plurality of fiber cords, being wound endlessly in spirals so that the fiber cords are substantially parallel in a circumferential direction of the tire, wherein the belt reinforcing layer cords are organic fiber cords, the elongation of the organic fiber cords under 1.4 g/d load at 50±5° C. is less than or equal to 2.7%, and the elongation under 0.7 g/d load at 170±5° C. is 1.5 to 6.0%.

2. A radial tire according to claim 1, wherein a ratio $N_1/N_2$ of the organic fiber cords is 0.8 to 1.3, $N_1$ being a slope of a tangent line at 1.4 g/d load of a stress-strain curve for 50±5° C., and $N_2$ being a slope of a tangent line at 0.25 g/d load of the stress-strain curve for 50±5° C.

3. A radial tire according to claim 1, wherein a twist coefficient of the organic fiber cords is 0.20 to 0.72, the twist coefficient R being defined as $R=N\times(0.139\times D/\rho)^{1/2}\times 10^{-3}$, wherein N is the number of twists of the cord per 10 cm, D is the total number of deniers of the cord, and ρ is the specific gravity of the cord.

4. A radial tire according to claim 1, wherein tan δ measured at a temperature of 60° C., a distortion of 1%, and a frequency of 50 Hz of a tread base rubber of the tread portion is 0.02 to 0.08.

5. A radial tire according to claim 1, wherein δ measured at a temperature of 60° C., a distortion of 1%, and a frequency of 50 Hz of a side rubber of the sidewall portions is 0.02 to 0.15.

6. A radial tire according to claim 1, wherein the organic fiber cords are polyethylene terephthalate fiber cords.

7. A radial tire according to claim 1, wherein the elongation of the organic fiber cords under 1.4 g/d load at 50±5° C. is less than or equal to 2.0%, and the elongation under 0.7 g/d load at 170±5° C. is 1.5 to 3.5%.

8. A radial tire according to claim 7, wherein a ratio $N_1/N_2$ of the organic fiber cords is 0.8 to 1.3, $N_1$ being a slope of a tangent line at 1.4 g/d load of a stress-strain curve for 50±5° C., and $N_2$ being a slope of a tangent line at 0.25 g/d load of the stress-strain curve for 50±5° C.

9. A radial tire according to claim 7, wherein the organic fiber cords are cords in which greater than or equal to 30% of the total number of deniers are polyethylene-2,6-naphthalate fibers.

10. A radial tire according to claim 7, wherein a twist coefficient of the organic fiber cords is 0.20 to 0.72, the twist coefficient R being defined as $R=N\times(0.139\times D/\rho)^{1/2}\times 10^{-3}$, wherein N is the number of twists of the cord per 10 cm, D is the total number of deniers of the cord, and ρ is the specific gravity of the cord.

11. A radial tire according to claim 7, wherein tan δ measured at a temperature of 60° C., a distortion of 1%, and a frequency of 50 Hz of a tread base rubber of the tread portion is 0.02 to 0.08.

12. A radial tire according to claim 7, wherein tan δ measured at a temperature of 60° C., a distortion of 1%, and a frequency of 50 Hz of a side rubber of the sidewall portions is 0.02 to 0.15.

13. A radial tire according to claim 1, wherein the elongation of the organic fiber cords under 1.4 g/d load at 50±5° C. is less than or equal to 1.8%, and the elongation under 0.7 g/d load at 170±5° C. is 2.0 to 3.0%.

14. A radial tire according to claim 13, wherein a twist coefficient of the organic fiber cords is 0.20 to 0.72, the twist coefficient R being defined as $R=N\times(0.139\times D/\rho)^{1/2}\times 10^{-3}$, wherein N is the number of twists of the cord per 10 cm, D is the total number of deniers of the cord, and $\rho$ is the specific gravity of the cord.

15. A radial tire according to claim 3, wherein tan $\delta$ measured at a temperature of 60° C., a distortion of 1%. and a frequency of 50 Hz of a tread base rubber of the tread portion is 0.02 to 0.08.

16. A radial tire according to claim 13, wherein tan $\delta$ measured at a temperature of 60° C., a distortion of 1%, and a frequency of 50 Hz of a side rubber of the sidewall portions is 0.02 to 0.15.

17. A radial tire according to claim 13, wherein the organic fiber cords are cords in which greater than or equal to 30% of the total number of deniers are polyethylene-2, 6-naphthalate fibers.

18. A radial tire according to claim 1, wherein the organic fiber cords are cords in which greater than or equal to 30% of the total number of deniers are polyethylene-2,6-naphthalate fibers.

19. A radial tire according to claim 18, wherein a twist coefficient of the organic fiber cords is 0.20 to 0.72, the twist coefficient R being defined as $R=N\times(0.139\times D/\rho)^{1/2}\times 10^{-3}$, wherein N is the number of twists of the cord per 10 cm, D is the total number of deniers of the cord, and $\rho$ is the specific gravity of the cord.

20. A radial tire according to claim 18, wherein tan $\delta$ measured at a temperature of 60° C., a distortion of 1%, and a frequency of 50 Hz of a tread base rubber of the tread portion is 0.02 to 0.08.

21. A radial tire according to claim 18, wherein tan $\delta$ measured at a temperature of 60° C., a distortion of 1%, and a frequency of 50 Hz of a side rubber of the sidewall portions is 0.2 to 0.15.

\* \* \* \* \*